United States Patent
Ding et al.

(10) Patent No.: US 10,677,960 B2
(45) Date of Patent: *Jun. 9, 2020

(54) GENERATING UNCONSTRAINED VORONOI GRIDS IN A DOMAIN CONTAINING COMPLEX INTERNAL BOUNDARIES

(71) Applicant: Saudi Arabian Oil Company, Dhahran (SA)

(72) Inventors: Xiang Yang Ding, Dhahran (SA); Larry Siu-Kuen Fung, Dhahran (SA); Ali H. Dogru, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 693 days.

This patent is subject to a terminal disclaimer.

(21) Appl. No.: 14/215,851

(22) Filed: Mar. 17, 2014

(65) Prior Publication Data
US 2015/0260017 A1 Sep. 17, 2015

(51) Int. Cl.
*G01V 99/00* (2009.01)
*E21B 43/00* (2006.01)

(52) U.S. Cl.
CPC ............ *G01V 99/005* (2013.01); *E21B 43/00* (2013.01); *G01V 2210/642* (2013.01)

(58) Field of Classification Search
CPC .............. G01V 99/005; G01V 99/00; G01V 2210/642; G01V 2210/66; G06T 17/20; E21B 43/00
See application file for complete search history.

(56) References Cited

U.S. PATENT DOCUMENTS

| | | | |
|---|---|---|---|
| 5,740,342 A * | 4/1998 | Kocberber | G06T 17/05 345/420 |
| 6,018,497 A | 1/2000 | Gunasekera | |
| 6,078,869 A | 6/2000 | Gunasekera | |
| 6,106,561 A | 8/2000 | Farmer | |
| 6,907,392 B2 | 6/2005 | Bennis | |
| 7,047,165 B2 | 5/2006 | Balaven et al. | |
| 7,277,836 B2 | 10/2007 | Netemeyer et al. | |
| 7,451,066 B2 | 11/2008 | Edwards et al. | |

(Continued)

FOREIGN PATENT DOCUMENTS

| | | |
|---|---|---|
| CA | 2803144 A1 | 12/2011 |
| WO | 2008150325 A1 | 12/2008 |

(Continued)

OTHER PUBLICATIONS

International Search Report and Written Opinion for related PCT application PCT/US2015/020690 dated Jul. 15, 2015.

(Continued)

*Primary Examiner* — Jay Hann
(74) *Attorney, Agent, or Firm* — Bracewell LLP; Constance G. Rhebergen; Albert B. Kimball, Jr.

(57) ABSTRACT

Unstructured grids are automatically constructed in a domain containing complex internal boundaries. Simulation grids are constructed for reservoirs or fields which contain complex fault planes. Reconciling among generated fault grid-points and other reservoir/field grid-points is performed, enabling the use of unconstrained Delaunay triangulation. High-quality orthogonal unstructured grids are provided with good convergence properties for reservoir simulation.

16 Claims, 14 Drawing Sheets

(56) References Cited

U.S. PATENT DOCUMENTS

| | | | |
|---|---|---|---|
| 7,634,395 B2* | 12/2009 | Flandrin | G06T 17/20 703/10 |
| 7,932,904 B2* | 4/2011 | Branets | G06F 17/5018 703/10 |
| 8,212,814 B2 | 7/2012 | Branets et al. | |
| 8,214,187 B2 | 7/2012 | Mouton et al. | |
| 8,301,429 B2 | 10/2012 | Hajibeygi et al. | |
| 8,386,227 B2 | 2/2013 | Fung et al. | |
| 8,433,551 B2 | 4/2013 | Fung et al. | |
| 8,463,586 B2 | 6/2013 | Mezghani et al. | |
| 2001/0006387 A1 | 7/2001 | Bennis et al. | |
| 2002/0038201 A1 | 3/2002 | Balaven et al. | |
| 2006/0235666 A1 | 10/2006 | Assa et al. | |
| 2007/0073527 A1 | 3/2007 | Flandrin et al. | |
| 2010/0128041 A1 | 5/2010 | Branets et al. | |
| 2010/0217574 A1 | 8/2010 | Usadi et al. | |
| 2011/0169838 A1 | 7/2011 | Branets et al. | |
| 2011/0313745 A1 | 12/2011 | Mezghani et al. | |
| 2012/0059639 A1 | 3/2012 | Fung et al. | |
| 2012/0179436 A1 | 7/2012 | Fung | |
| 2012/0232859 A1 | 9/2012 | Pomerantz et al. | |
| 2013/0096889 A1 | 4/2013 | Khvoenkova et al. | |
| 2014/0236559 A1* | 8/2014 | Fung | G01V 11/00 703/10 |
| 2015/0260016 A1* | 9/2015 | Fung | E21B 41/00 703/10 |

FOREIGN PATENT DOCUMENTS

| | | |
|---|---|---|
| WO | 2011163166 A2 | 12/2011 |
| WO | 2012033650 A2 | 3/2012 |
| WO | 2012033693 A2 | 3/2012 |
| WO | 2014126959 A2 | 8/2014 |

OTHER PUBLICATIONS

Heinemann et al., "Gridding Technique in Reservoir Simulation", First Intl. Forum on Reservoir Simulation, 1988, pp. 339-425, XP002741071.

Katzmayr et al., "An Iterative Algorithm for Generating Constrained Voronoi Grids", SPE Reservoir Simulation Symposium, 2009, pp. 1-11, Society of Petroleum Engineers XP002741070.

Matijevic et al. "Modeling Faults in Reservoir Simulation", 4th European Conference on the Mathematics of Oil Recovery, 1994, pp. 1-16.

Mlacnik et al., "Sequentially Adapted Flow-Based PEBI Grids for Reservoir Simulation", SPE Journal, 2006, pp. 317-327, Society of Petroleum Engineers XP002741069.

Z.E. Heinemann et al., "Modeling Heavily Faulted Reservoirs," SPE 48998; SPE Annual Technical Conference and Exhibition, New Orleans, LA; Sep. 27-30, 1998; 11 pages.

Larry S.K. Fung et al., "An Unstructured Gridding Method for Densely-Spaced Complex Wells in Full-Field Reservoir Simulation," SPE 163648; SPE Reservoir Simulation Symposium, The Woodlands, Texas; Feb. 18-20, 2013; 13 pages.

Larry S. K. Fung et al., "Distributed Unstructured Grid Infrastructure for Complex Reservoir Simulation," SPE 113906; proceedings of the SPE EuroPEC/EAGE Annual Conference and Exhibition, Rome, Italy; Jun. 9-12, 2008; 2 pages.

Ali H. Dogru et al., "New Frontiers in Large Scale Reservoir Simulation," SPE 142297; SPE Reservoir Simulation Symposium, The Woodlands, Texas; Feb. 21-23, 2011; 12 pages.

Ali H. Dogru et al., "A Next-Generation Parallel Reservoir Simulator for Giant Reservoirs," SPE 119272; SPE Reservoir Simulation Symposium, The Woodlands, Texas; Feb. 2-4, 2009; 29 pages.

Larry S. K. Fung et al., "Using Unstructured Grids for Modeling Densely-Spaced Complex Wells in Field-Scale Reservoir Simulation," IPTC 17062; International Petroleum Technology Conference, Beijing, China; Mar. 26-28, 2013; 14 pages.

Branets, L. et al., 'Challenges and Technologies in Reservoir Modeling', Communications In Computational Physics, vol. 6, No. 1, pp. 1-23; Jul. 2009.

Dictionary.com "Parallel" available at <http://www.dictionary.com/browse/parallel>; Apr. 25, 2017, p. 1-8.

Edwards, M.G. "Unstructured, Control-Volume Distributed, Full-Tensor Finite-Volume Schemes with Flow Based Grids" Computational Geosciences, vol. 6, pp. 433-452 (2002).

International Search Report and Written Opinion for PCT/US2014/015935 dated Jul. 1, 2015.

International Search Report and Written Opinion for PCT/US2015/020677 dated Jan. 26, 2016.

Karimi-Fard, M. et al., SPE 141675 'An Expanded Well Model for Accurate Simulation of Well-Reservoir Interaction', SPE Reservoir Simulation Symposium, The Woodlands, Texas, USA, Feb. 21-23, 2011.

Mundal, S. el al., 'Simulation of Anisotropic Heterogeneous Near-Well Flow Using MPFA Methods on Flexible Grids', Comput Geosci (2010) 14:509-525.

Partial International Search Report for PCT/US2014/015935 dated Feb. 25, 2015.

Partial International Search Report for PCT/US2015/020677 dated Nov. 4, 2015.

Vestergaard, H. et al., 'The Application of Unstructured-Gridding Techniques for Full-Field Simulation of a Giant Carbonate Reservoir Developed With Long Horizontal Wells', SPE Reservoir Evaluation & Engineering, vol. 11, No. 6, Dec. 2008.

Japanese Office Action dated Nov. 8, 2017 for corresponding Japanese application No. 2016-558139.

English Translation of Japanese Office Action dated Nov. 8, 2017 for corresponding Japanese Patent Application No. 2016-558139.

Japanese Office Action dated Dec. 4, 2017 for corresponding Japanese Patent Application No. 2016-557914.

English Translation of Japanese Office Action dated Dec. 4, 2017 for corresponding Japanese Patent Application No. 2016-557914.

Coats, K. "Reservoir Simulation" Petroleum Engineering Handbook; Chapter 48; 1987; pp. 1-20.

Verma, S. et al.; "A Control Volume Scheme for Flexible Grids in Reservoir Simulation" SPE 37999, SPE Reservoir Simulation Symposium, Dallas, Texas, Jun. 8-11, 1997, pp. 215-227.

* cited by examiner

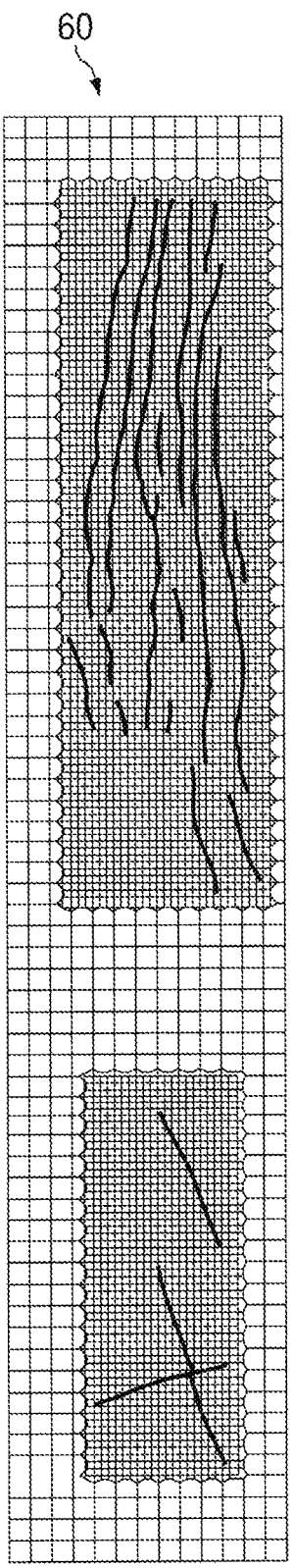
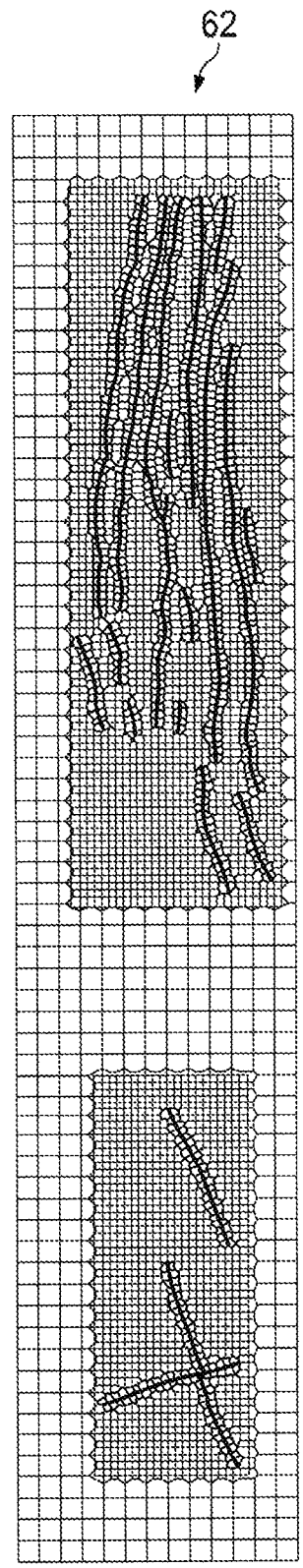
FIG. 6A
(PRIOR ART)
FIG. 6B

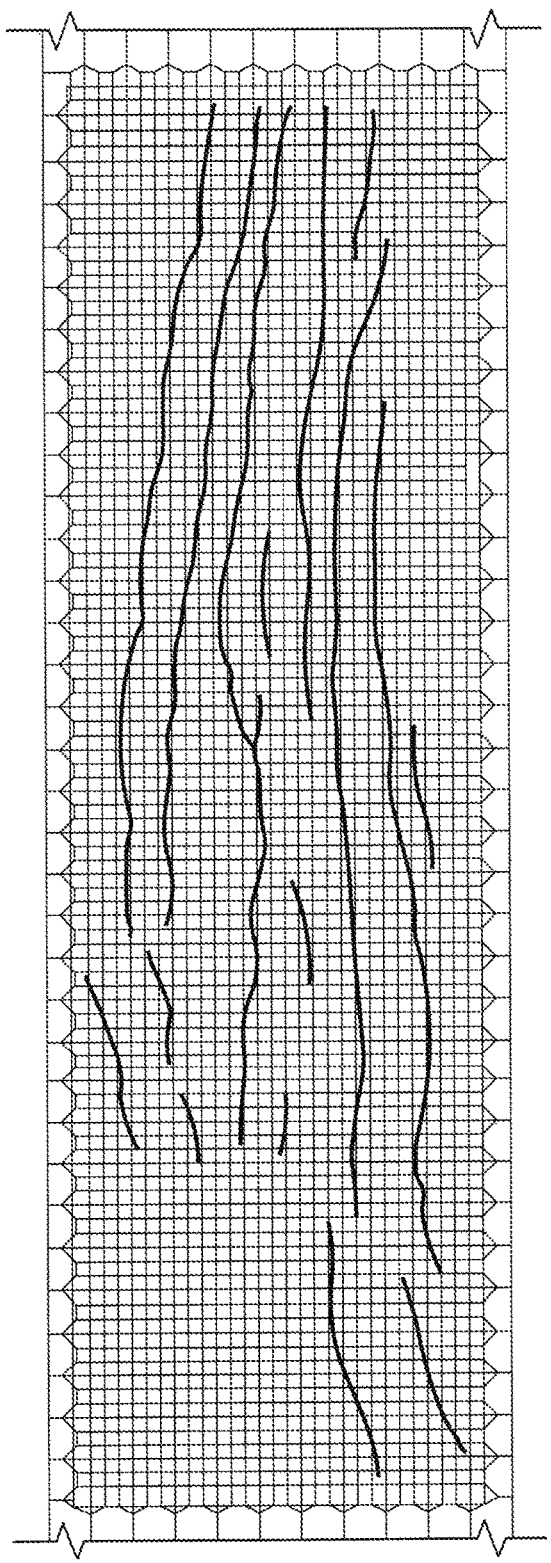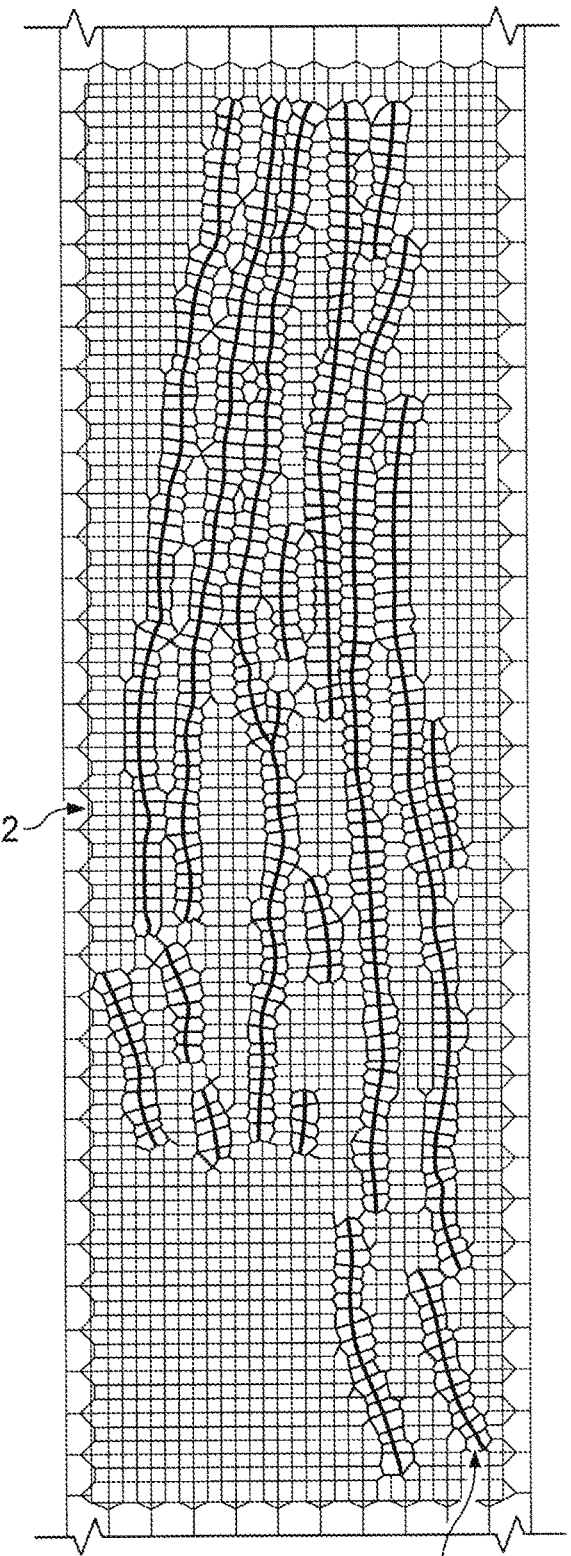
FIG. 7A
(PRIOR ART)
FIG. 7B

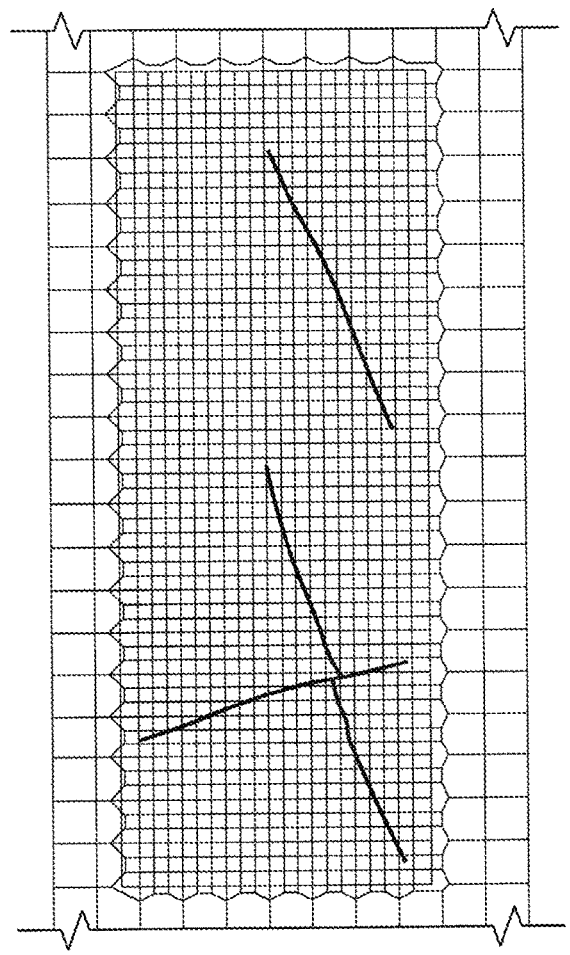 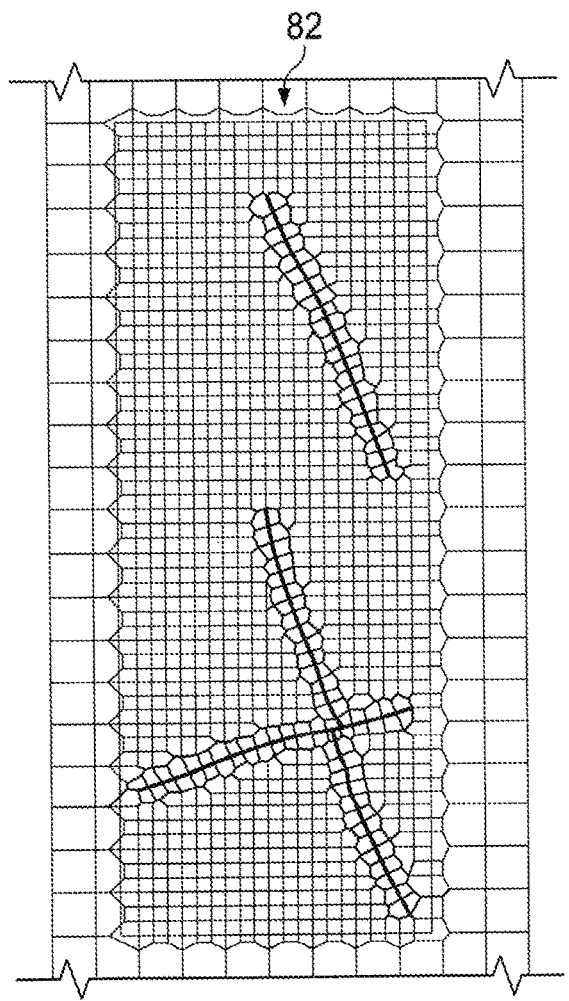
FIG. 8A (PRIOR ART)
FIG. 8B

GENERATING UNCONSTRAINED VORONOI GRIDS IN A DOMAIN CONTAINING COMPLEX INTERNAL BOUNDARIES

CROSS REFERENCE TO RELATED APPLICATIONS

The present application relates to modeling for reservoir simulation, as do Applicant's prior co-pending U.S. patent application Ser. No. 14/171,815, "Systems, Methods, and Computer-Readable Media for Modeling Complex Wellbores in Field-Scale Reservoir Simulation," filed Feb. 4, 2014, based on U.S. Provisional Patent Application No. 61/766,056, "Systems, Methods, and Computer-Readable Media for Modeling Complex Wellbores in Field-Scale Reservoir Simulation," filed Feb. 18, 2013 (SA 5125); and Applicant's companion U.S. patent application Ser. No. 14/215,766, "Modeling Intersecting Faults And Complex Wellbores In Reservoir Simulation", (SA 5262) filed of even date herewith. Each of these related applications is incorporated herein by reference for all purposes.

BACKGROUND OF THE INVENTION

1. Field of the Invention

The present invention relates to modeling wellbores in reservoir simulation, and more particularly to generating unconstrained Voronoi grids in a domain containing complex internal boundaries.

2. Description of the Related Art

Reservoir simulation is the primary tool used by the oil industry for the planning and development of subterranean hydrocarbon reservoirs. With the advancement of drilling technology, wellbores which have multiple branches and complex geometries are increasingly being deployed in order to enhance production and injection processes in these reservoirs.

Applicant's related prior co-pending U.S. patent application Ser. No. 14/171,815 mentioned above relates to accurately modeling near-wellbore flow for complex wells to enhance the performance prediction for these wells. The modeling allows reservoir analysts and engineers improved data about wells and reservoirs for the decision making process to exploit the available resources.

A Corner-point-geometry or CPG grid is a known and often used to represent faults in reservoir simulation models. An example of a CPG grid is shown at G in FIG. 2. A CPG grid is a flexible, structured grid in which each finite-volume cell is a hexahedron defined by its eight-corner coordinates. For a severely faulted model, the grid can become severely distorted and non-orthogonal. A technique known as multi-point flux approximation (MPFA) is normally required to maintain discretization accuracy. However, numerical difficulties can be caused for an iterative linear solver when solving the multiphase flow problems using discretization in this manner. In practice, only major faults are represented so that the grid is not too distorted.

Unstructured gridding around internal boundaries has also been done. So far as is known, unstructured gridding for the most part has used what is known as Delaunay triangulation, with what is known as a Voronoi grid being the dual grid of the generated triangular mesh.

Traditionally, in order to preserve the internal boundary geometry, the applied Delaunay triangulation has to be constrained in order to honor internal boundary lines as the generated triangle's edge. This technique is described U.S. Pat. No. 8,212,814, "Generation of a Constrained Voronoi Grid in a Plane", Branets et al. During the constrained Delaunay triangulation of this technique, unstructured grid points have to be adjusted, repositioned or removed, or new grid points have to be inserted explicitly near the internal boundary in order to satisfy the constraint criteria to have the generated near-internal-boundary triangles have edges on the internal boundary. Such a grid point adjustment procedure is called grid smoothing. It is usually computationally expensive, especially for large simulation models. Additionally, it leads to congested grid regions in order to satisfy boundaries but at the cost of lessened discretization, and less satisfactory convergence for reservoir simulation.

In the prior art, in the near intersection area, the grid points from each of the internal boundaries were kept during Delaunay triangulation which in turn could create many bad shaped triangles with small angles. This is discussed in "Modeling Heavily Faulted Reservoirs," SPE paper 48998, SPE Annual Technical Conference and Exhibition, New Orleans, La., USA, Sep. 27-30, 1998, Heinemann, et al. As a consequence, such undesired triangles increased modeling complexity and introduced numerical errors which eventually led to poor discretization and poor computational efficiency during flow simulation.

The prior art constrained Voronoi grid generation used a constrained method which involved grid smoothing to force the generated Voronoi cell edge to conform to the internal boundary geometry. The grid smoothing had to swap triangle edges, re-position grid points, or insert a new point in order to preserve the internal boundary geometry structure.

SUMMARY OF THE INVENTION

Briefly, the present invention provides a new and improved computer implemented method of generating an unstructured grid of a model of a subsurface reservoir based on input data defining internal boundary geometry and internal boundary descriptions of the reservoir, model. With the present invention, the internal boundary geometry data are refined to produce boundary vertex points for the grid. Internal boundary lines are built by connecting adjacent boundary vertex points to form boundary line segments. Internal boundary intersected circles are then constructed at the boundary vertex points. Near Internal boundary grid cell points are generated from the intersections of internal boundary intersected circles of adjacent boundary vertex points. The generated near internal boundary grid cell points are then prioritized, and Unconstrained Delaunay triangulation is performed with the near internal boundary grid cell points being triangle vertices. Voronoi cells are then generated by perpendicular bisection of the triangle edges to form unstructured grid cell edges honoring prescribed internal boundary line segments, and the unstructured gridding data provided as outputs.

The present invention also provides a new and improved data processing system for generating an unstructured grid of a model of a subsurface reservoir based on input data defining internal boundary geometry and internal boundary descriptions of the reservoir model. The data processing system comprising a processor which refines the internal boundary geometry data to produce boundary vertex points for the grid, and builds internal boundary lines connecting adjacent boundary vertex points to form boundary line segments. The processor then constructs internal boundary intersected circles at the boundary vertex points, and generates near internal boundary grid cell points from the intersections of internal boundary intersected circles of adjacent boundary vertex points. The processor also prioritizes the generated near internal boundary grid cell points, and performs unconstrained Delaunay triangulation with the near internal boundary grid cell points being triangle vertices. The processor then generates Voronoi cells by perpendicular bisection of the triangle edges to form unstructured grid cell edges honoring prescribed internal boundary line segments, and outputs the unstructured gridding data.

The present invention also provides a new and improved data storage device having stored in a non-transitory computer readable medium computer operable instructions for causing a data processing system to generate an unstructured grid of a model of a subsurface reservoir based on input data defining internal boundary geometry and internal boundary descriptions of the reservoir model. The instructions stored in the data storage device cause the data processing system to refine the internal boundary geometry data to produce boundary vertex points for the grid, and build internal boundary lines connecting adjacent boundary vertex points to form boundary line segments. The instructions also cause the data processing system to construct internal boundary intersected circles at the boundary vertex points, and generate near internal boundary grid cell points from the intersections of internal boundary intersected circles of adjacent boundary vertex points. The instructions further cause the data processing system to prioritize the generated internal boundary grid cell points, and perform unconstrained Delaunay triangulation with the internal boundary grid cell points being triangle vertices. The instructions then cause the data processing system to generate Voronoi cells by perpendicular bisection of the triangle edges to form unstructured grid cell edges honoring prescribed internal boundary line segments, and output the unstructured gridding data.

BRIEF DESCRIPTION OF THE DRAWINGS

FIG. 6A is a schematic diagram illustrating an example of Voronoi cells formed without practice of the present invention.

FIG. 6B is a schematic diagram illustrating an example of Voronoi cells formed according to the present invention.

FIGS. 7A and 7B are enlarged views of portions of FIGS. 6A and 6B, respectively.

FIGS. 8A and 8B are enlarged views of portions of FIGS. 6A and 6B, respectively.

DETAILED DESCRIPTION OF THE PREFERRED EMBODIMENTS

A subsurface reservoir may have one or multiple complex internal boundaries with irregular intersecting geometry. Typically there are several. Accurate modeling of fluid flow and transport across these internal boundaries in reservoir simulation is an important consideration. The present invention patent provides a methodology to construct unconstrained Voronoi grids where the generated Voronoi cell edges conform to the internal boundary geometry.

Figure 1A:
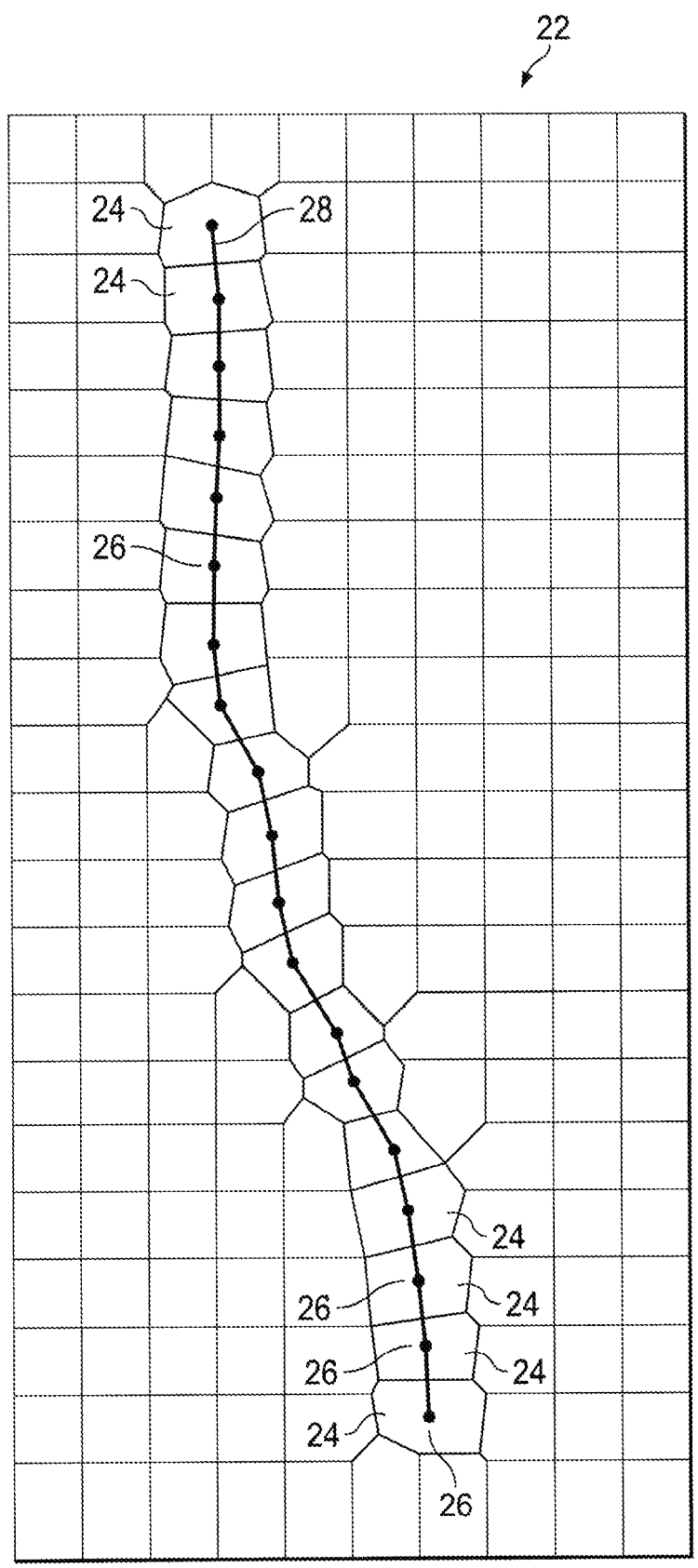
FIG. 1A is a schematic display of a type of boundary grid formed for modeling a complex wellbore using the wellbore as an internal boundary.

In the drawings, FIG. 1A illustrates a Voronoi cell diagram 18 for a boundary grid 20, in which is formed according to Applicant's related co-pending U.S. patent application Ser. No. 14/171,815 previously referenced, a model of a complex wellbore 22. According to such application, the wellbore 22 is taken as an internal boundary in the reservoir, and Voronoi cells 24 are generated by aligning cell centers 26 on the wellbore trajectory path 28. In the context of the present invention, internal boundaries according to Applicant's related co-pending U.S. patent application are referred to as Type 1 boundaries.

According to the present invention, a new and improved computer implemented methodology is provided for accurate modeling of another type of internal boundary. In the context of a reservoir simulation model, this internal boundary can be a fault plane or another type of discontinuity within the model. Other such types of discontinuities which are internal boundaries according to the present invention may include, for example, fractures or other forms of discontinuity in nature, such as boundaries for faces or hydraulic units.

Figure 1B:
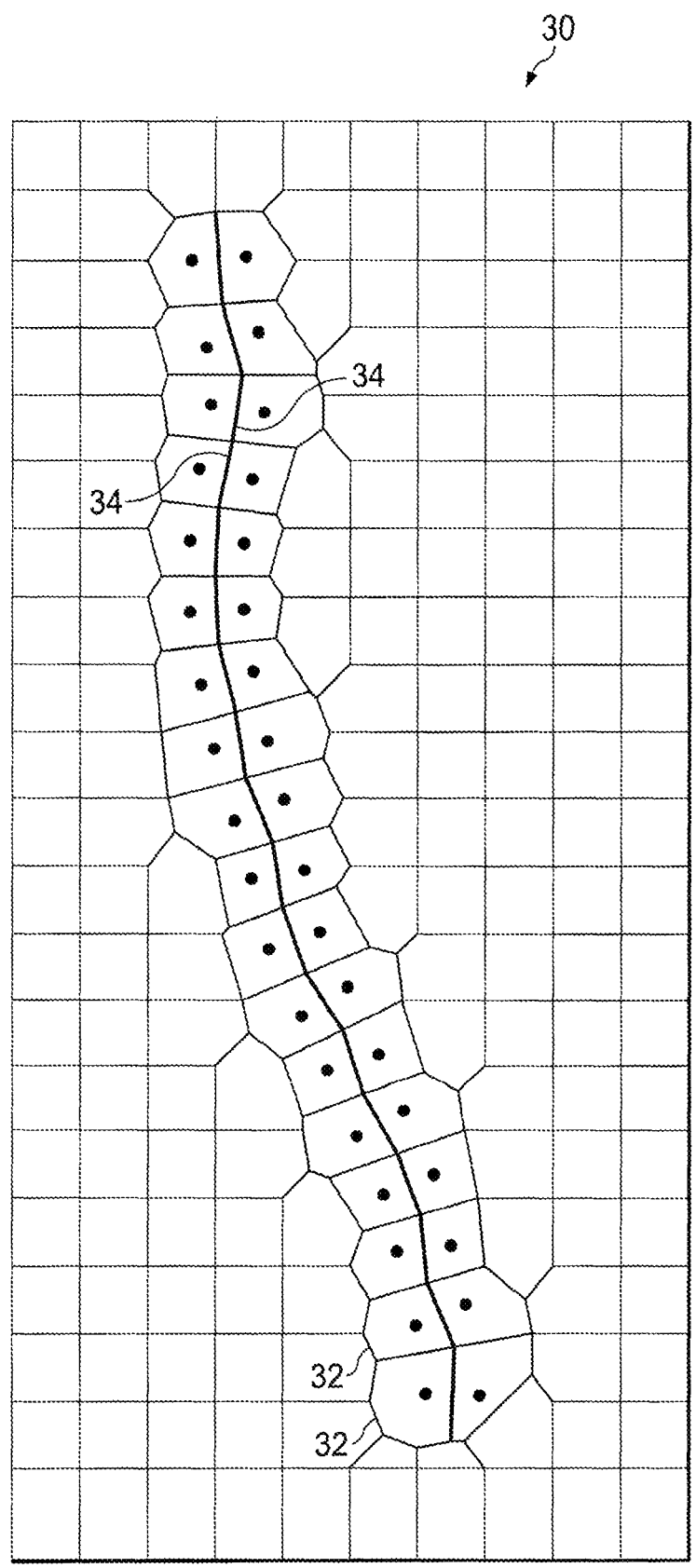
FIG. 1B is a schematic display of a type of boundary grid formed according to the present invention for modeling an internal discontinuity (for example, a fault, a barrier, a material-type boundary) as an internal boundary.
Figure 2:
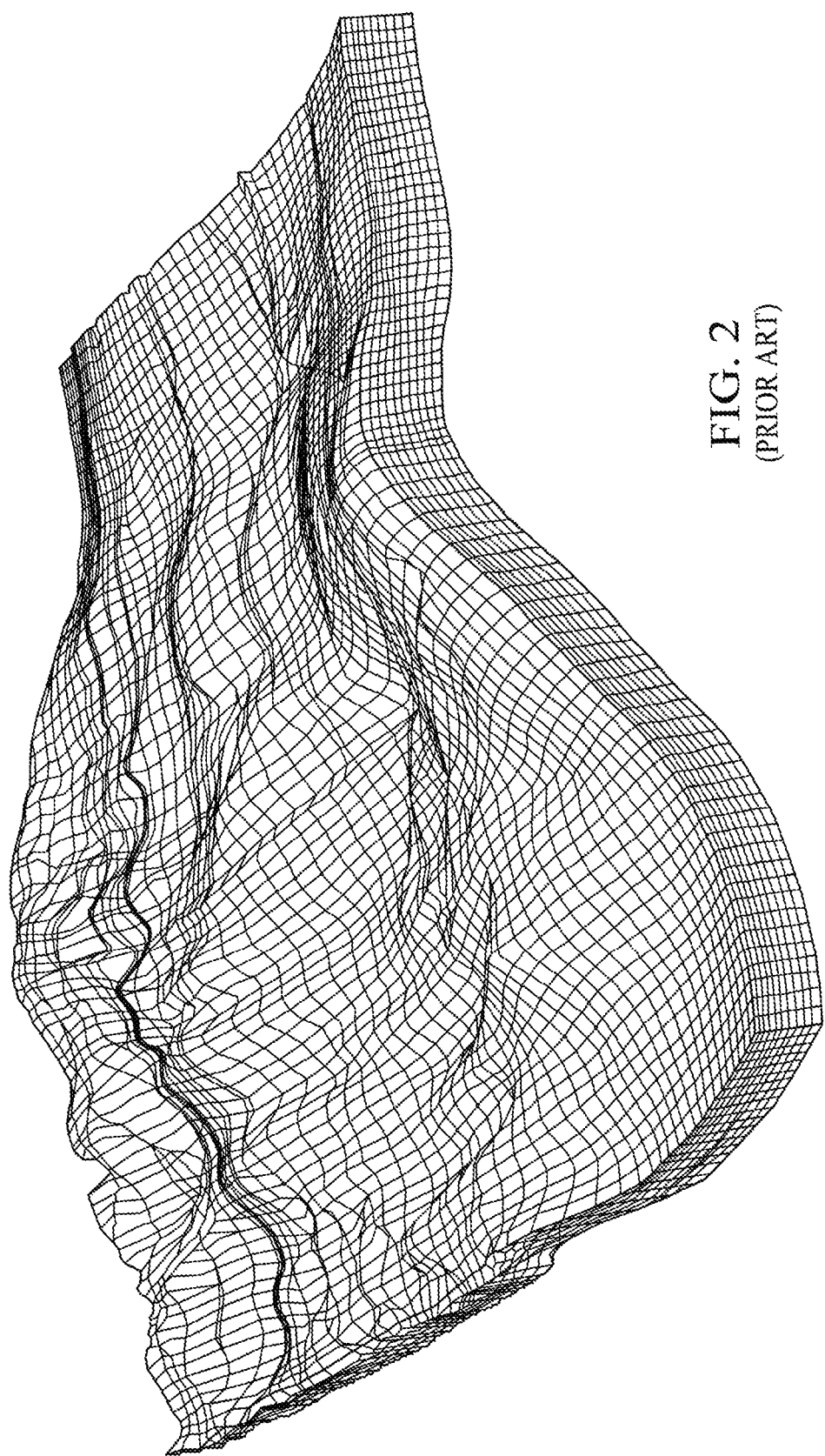
FIG. 2 is a display of a prior art corner-point-geometry or CPG grid to represent internal discontinuities such as faults in a reservoir.

The present invention generates Voronoi cells by placing the cell centers on the two sides of the internal boundary, thus aligning the cell edges on the internal boundary by using an unconstrained Voronoi grid method. A typical Voronoi cell diagram 30 of the present invention is illustrated in FIG. 1B, with internal discontinuities in the form of the internal boundary 34 and boundary grid 32. In the context of the present invention, internal boundaries according to the present invention are referred to as Type 2 boundaries.

The present invention enhances the unstructured near-well modeling capability of Applicant's prior co-pending U.S. application Ser. No. 14/171,815 to include complex internal boundaries, such as faults or other discontinuities, in the unstructured grid reservoir simulation framework. Unstructured gridding is improved to an integrated system with accurate near internal boundary modeling capabilities to include a combination of complex wellbores, faults and/or fractures.

In the present application, an unconstrained approach is also provided to remove the complicated grid smoothing steps and produce high quality, boundary conforming grids without the need of applying constrained criteria.

With the present invention, the conflicting point removal strategy of Applicant's companion U.S. patent application filed of even date herewith is further improved to include the internal boundary grid point in the strategy. During the unconstrained Voronoi gridding, all the internal boundary grid points in the domain are assigned with weighted values; this is followed by a point optimization procedure to remove the conflicting internal boundary grid points which are too close to each other. Higher priority is given to the internal boundary grid points which better satisfy the near internal boundary grid density requirement, so that both the grid density and internal boundary modeling requirement can be simultaneously satisfied. As a result, optimal spacing between internal boundary grid points is maintained and triangles with desired angles and shapes are generated which will lead to better approximations for reservoir simulation.

Further, with the present invention, the unconstrained Delaunay triangulation method is able to avoid grid smoothing complexities. Intelligently placed internal boundary grid points geometrically insure that the Voronoi cell edges conform to the irregular internal boundary geometry.

In reservoir simulation, as mentioned above, the internal boundary can be faults, fractures or any other forms of discontinuity in nature, such as boundaries for geological facies or hydraulic units. Using the methodology according to the present invention, there is no need for the grid smoothing step required during Delaunay triangulation according to the prior art.

For example, U.S. Pat. No. 8,212,814, previously referenced, relies on grid smoothing, such as edge swapping, insertion of new grid points or removal of existing grid points, to reposition the triangle's edges. Grid smoothing is required so that the near internal boundary triangle's edges can be aligned on the internal boundaries in order to preserve the internal boundary geometry.

The present invention improves the unstructured gridding processing according to Applicant's previously referenced co-pending application Ser. No. 14/171,815, by integrating any suitable number of internal boundaries into the unstructured gridding workflow. In this manner, multiple internal boundaries, including intersecting internal boundaries, can be modeled together in the domain. When an internal boundary is close to or intersects another internal boundary in unstructured gridding processing, the present invention provides for internal boundary grid points to be included in and improve the prioritization processing of Applicant's previously referenced co-pending application. As a result, the internal boundary point prioritization strategy optimally balances the requirement of near internal boundary grid density and the need to preserve the internal boundary irregular geometry.

The present invention honors internal boundaries via a priori method steps to satisfy boundary constraint and grid density requirements. The present invention affords an unconstrained Delaunay triangulation method. The internal boundaries are correctly modeled by the Voronoi dual grid edges without the complexity of grid smoothing, which is an expensive post-processing step to constrain Delaunay triangulation to honor the specified boundaries. The conflicting internal boundary points near the internal boundary intersection area are optimally merged according to the present invention after each of their positions is evaluated together with all of the gridding criteria.

Processing Methodology

Figure 3:
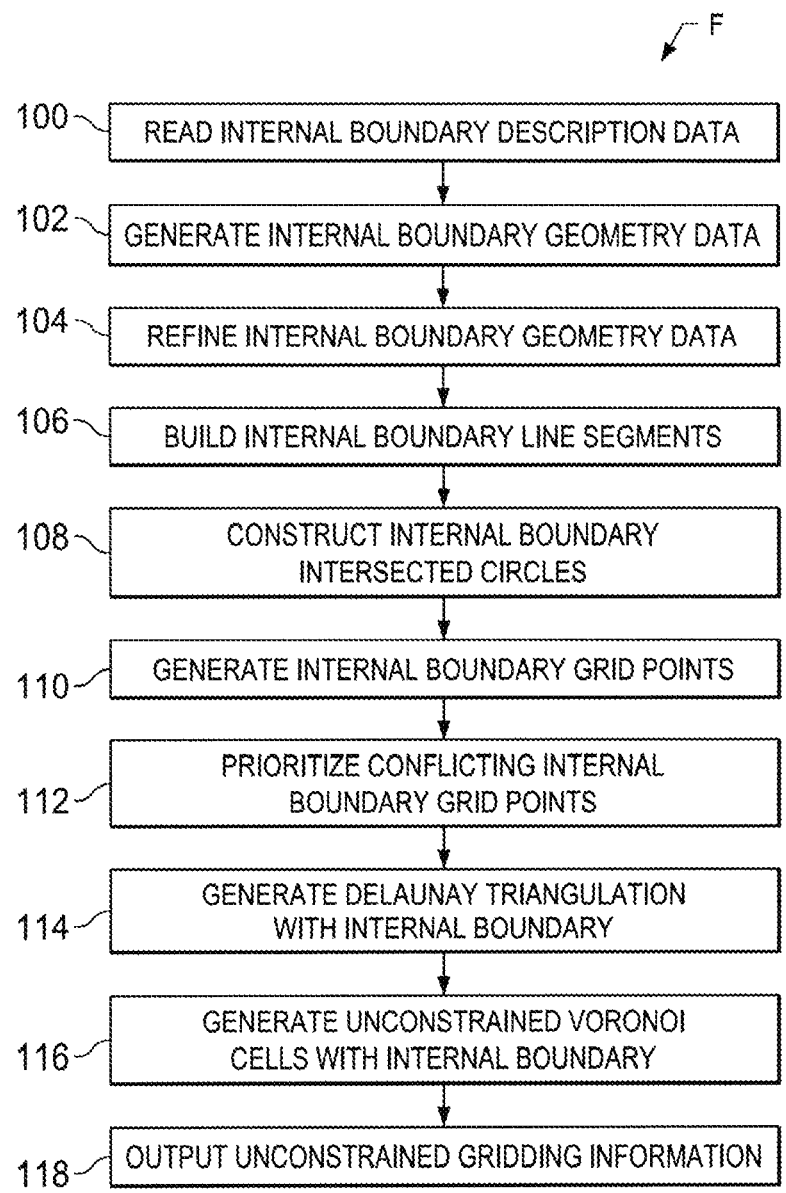
FIG. 3 is a functional block diagram of a flow chart of data processing steps for generating unconstrained Voronoi grids in a domain containing complex internal boundaries according to the present invention.

A flow chart F (FIG. 3) illustrates the basic computer processing sequence performed by a data processing system P (FIG. 12) for near internal boundary unstructured Voronoi gridding according to the present invention and the computational methodology taking place during a typical embodiment of an internal boundary unstructured gridding according to the present invention.

In Step 100, the internal boundary description is read into the unstructured grid builder. The unstructured grid builder of the present invention is compatible with commercial reservoir simulation pre-processing software which builds geological models, and the internal boundary representation data created in such commercially available software, such as PETREL and GoCAD, usually outputted in corner-point-geometry CPG format, is loaded into the unstructured grid builder.

In Step 102, the unstructured grid builder interprets the loaded internal boundary description against the geological model. The processing during Step 102 then generates the internal boundary geometry data, which is composed of the vertex points in 3D coordinates of the corner-point-geometry grid cell at the initial input internal-boundary description.

In Step 104, the internal-boundary-geometry points resulting from Step 102 are sampled and refined based on the grid density requirement in the near internal boundary area. A partial point set of the internal-boundary-geometry points is selected where the distance between the neighboring selected points satisfies the near-internal-boundary grid spacing requirement. The boundary-grid spacing is selected to balance between internal boundary shape representation, grid resolution to model flow near the boundaries, and the required computational resources to run simulation. The internal boundaries can be intersecting.

With the present invention, a methodology is provided to optimize the selected internal-boundary-geometry point set. The first point of the input point set is always selected. Next, the distance between the first point and the second point in the data set is compared with the requested grid density spacing near the internal boundary. There are three scenarios in the comparison: (1) when the distance is equal to the grid density spacing, the second point is also kept as one optimized point, then the distance between the second point and third point is used in the next comparison to evaluate if the third point is qualified as another optimized point; (2) when the distance is smaller than the grid density spacing, then the second point is skipped so that the distance between the first point and the third point is used in the comparison; (3) when the distance is larger than the grid density spacing, an interpolated point is added to the initial point set between the two neighboring points and the distance between the first point and the new point is equal to the grid spacing. This interpolation step is needed if the existing points cannot satisfy both the grid density requirement and internal boundary geometry representation locally. For example, when the requested grid density spacing is smaller than the CPG cell edge width, an interpolated point is inserted in order to satisfy the grid density requirement, and the interpolated point improves modeling the internal boundary geometry locally as the local geometry representation is not detailed enough with respect to the requested grid density. The result of the refined internal boundary geometry data from Step 104 is an optimal set of points whose accuracy is critical to the success of the near-internal-boundary unstructured gridding. The resultant point set must meet the grid density requirement in the near-internal-boundary area but also be geometrically representative to the irregular internal-boundary geometry.

Figure 4A:
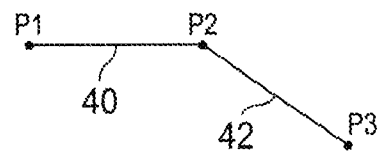
FIG. 4A is a schematic diagram illustrating internal boundary geometry points and approximated line segments formed during the data processing steps of FIG. 3.

In Step 106, after the refined internal-boundary-geometry points are created, each pair of immediate close points in the refined point set is connected by straight lines. The result of Step 106 is a set of line segments such as 40 and 42 (FIG. 4A) whose distance is the grid size required in the near internal boundary area. The set of line segments are also geometrically representative to model the internal boundary structure given in the initial internal boundary description. FIG. 4A is a schematic representation of line segments formed by the data processing system P during step 106. The line segments 40 and 42 shown in FIG. 4A are illustrative graphical examples of the data values defining the internal boundary structure according to the grid size during processing according to the present invention.

Figure 4B:
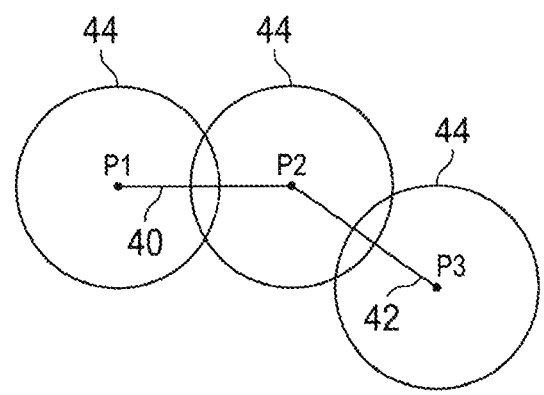
FIG. 4B is a schematic diagram illustrating circles formed during the data processing steps of FIG. 3.

In Step 108, intersected circles 44 (FIG. 4B) are constructed by the data processing system P after a circle for each internal boundary point is formed. As shown in FIG. 4B, the circle for each internal boundary point is formed by using the internal boundary point formed during Step 104 as the center. The circles 44 shown in FIG. 4B are illustrative graphical examples of the geometrical analytics performed on reservoir grid data during processing according to the present invention. The radius of each intersected circle is selected so that it is greater than a half-length of the corresponding line segment formed during Step 106, but less than the full length of such line segment. This is done in order for the circle intersecting with the neighboring circle and the intersected point to be at a desired distance from the line segment, as shown in FIG. 4C.

With the present invention, a radius length found desirable for Step 108 is 0.6 of the line segment length. It should be understood, however, that other ratios or fractions of line segment length other than 0.6 may also be used as a ratio according to the present invention. However, it is to be noted that the radius length selected determines the distance of the intersected point to the line segment, and that distance is important to the shape of the Voronoi grid cells, as will be discussed in the subsequent two steps.

Figure 4C:
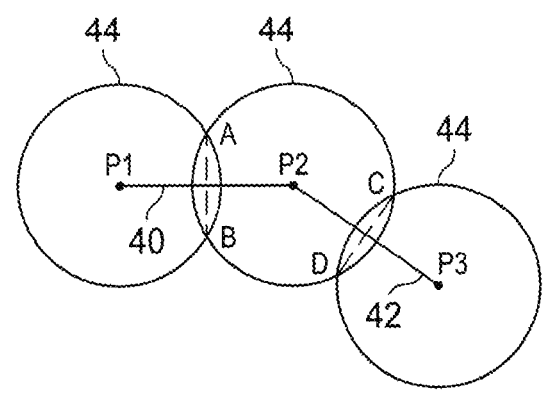
FIG. 4C is a schematic diagram illustrating internal boundary grid points generated from circle intersection of the circles during the data processing steps of FIG. 3.

In Step 110, the neighboring circles 44 formed during Step 108 generate intersection points, such as point A and B, as well as C and D, as shown in FIG. 4C. The circles 44 and intersection points A, B, C, and D shown in FIG. 4C are illustrative graphical examples of the geometrical analytics performed on reservoir grid data during processing according to the present invention. As the line segment end points, P1 and P2, are the center points of the circles 44, the line segment 40 or P1P2 is perpendicular to line segment AB and passes through line segment AB's midpoint. With the internal boundary unstructured gridding according to the present invention, the intersection points, A and B, are taken as the near internal boundary grid cell points. Similarly, intersection points C and D are taken as near internal boundary grid cell points. These near internal boundary grid cell points become triangular vertices of the Delaunay triangles.

In Step 112, the near internal-boundary grid cell points are optimally managed by prioritizing all the potentially conflicting grid points. The optimization and prioritization is done according to Applicant's prior co-pending U.S. patent application Ser. No. 14/171,815, previously referenced, which is incorporated herein by reference. This optimization step is necessary when two or more internal boundaries are close or intersecting where dense grid cell points may appear in the final grids, as exemplified in the prior art in FIG. 11A. As a result, the remaining grid points after this procedure are the optimal set of points for all the internal boundaries whose corresponding Voronoi cells satisfy the required grid density requirement and also preserve the complex internal boundary structure.

In Step 114, the optimal near internal boundary grid cell points such as point A, B, C, and D in FIG. 4C resulting from Step 112 are passed to Delaunay triangulation. The Delaunay triangulation is done according to Applicant's prior co-pending U.S. patent application Ser. No. 14/171,815, previously referenced, which is incorporated herein by reference. The output of the Delaunay triangulation is a set of triangles wherein the dual grid edges formed by perpendicular bisection of triangle edged AB and CD are the internal boundary line segments P1P2 and P2P3 of FIG. 4C.

In Step 116, the dual or Voronoi grid of the Delaunay triangulation is generated by perpendicular bisection method of the triangular edges. As indicated schematically, the line segment AB in FIG. 4C is the triangle's edge. The nature of a Voronoi cell is that its cell edge is the perpendicular bisector of the triangle's edges. Thus, the triangle's edge AB generates a Voronoi cell edge which is indicated schematically in FIG. 4C as the line segment of P1P2. Similarly, triangle edge CD generates a Voronoi cell edge which is which is indicated schematically in FIG. 4C as the line P2P3.

With the present invention, without setting a constraint to force the internal boundary line segments to be the Voronoi cell edges, the Voronoi cell generation methodology of the present invention insures that the prescribed internal boundary line segments are honored. As a result, Voronoi cell edge intersection points, P1, P2, and P3 indicated schematically in FIG. 4C, are the Voronoi cell vertices and the circle intersection point A, B, C, and D are the Voronoi cell centers.

Figure 5:
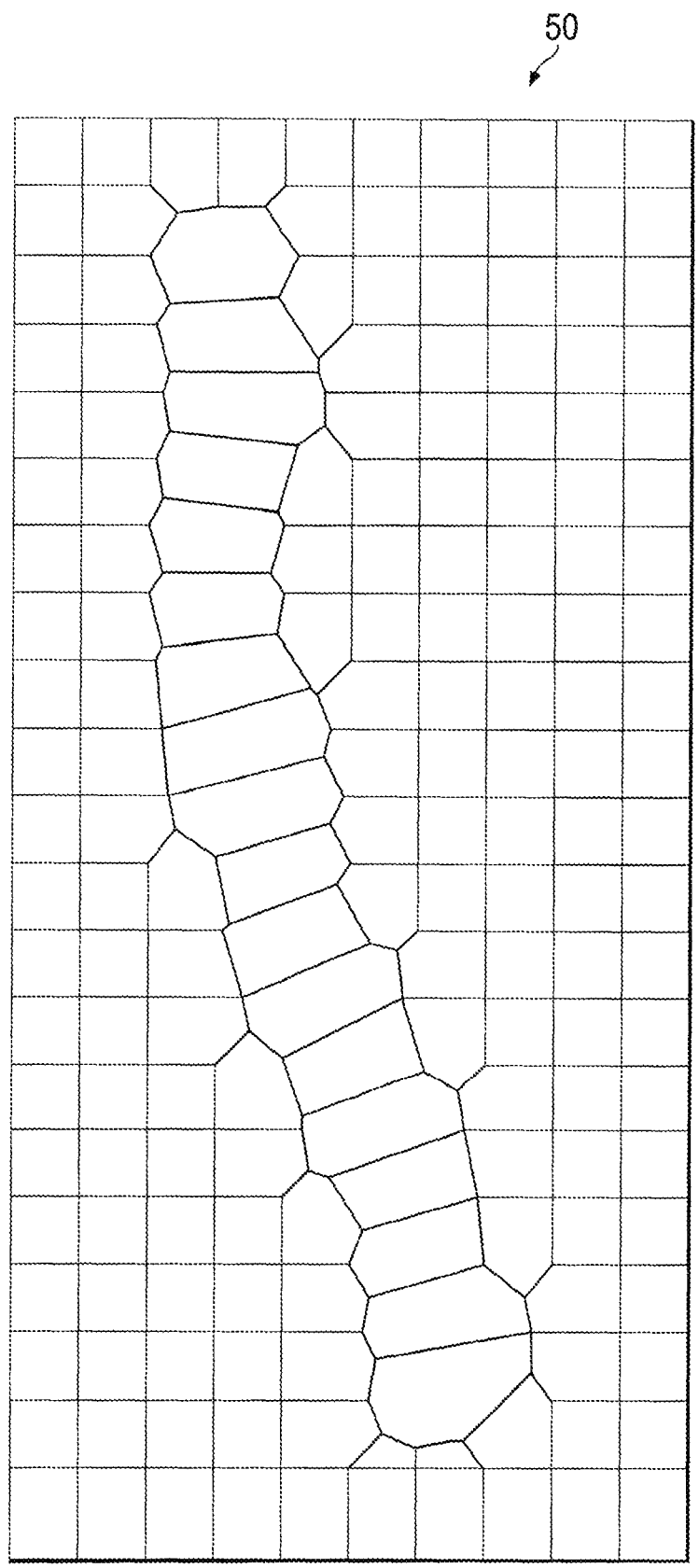
FIG. 5 is a schematic diagram illustrating example Voronoi cells in a near-internal boundary region generated according to the present invention.

In Step 118, the generated grid geometry data from Step 116 is provides as output for use by the data processing system P in reservoir simulation and or other purposes such as analysis or visualization. FIG. 5 illustrates a typical near internal boundary Voronoi cell diagram 50 generated with the present invention. FIG. 5 and FIG. 1B are based on the same internal boundary unstructured gridding result, where the Voronoi cell centers are only shown in FIG. 1B but not in FIG. 5; both figures demonstrates the generated Voronoi cells for the given internal boundary where an appropriate grid density spacing is chosen to satisfy both the grid density requirement and the internal boundary geometry representation by using the present invention. The generated grid geometry data is composed of data according to Applicant's U. S. Pat. No. 8,463,586 with additional data for the fault description to facilitate numerical simulation in Applicant's related U. S. patent application Ser. No. 14/215,766, filed of even date herewith, entitled "Modeling Intersecting Faults and Complex Wellbores in Reservoir Simulation". This additional data may include, for example, gridding specifications, such as region definitions (field region and reservoir region polygons), region grid size, fault data description, fault grid size, well data locations, geological model file, and other optional input, such as future well data and local grid refinement (LGR) criterion.

A pilot study has been performed using the present invention for a full-field model which is known to contain 21 complex internal boundaries in two reservoirs. Testing has shown that the unstructured grids generated from the unconstrained Voronoi grid method of the present invention preserves the irregular shapes of the 21 complex internal boundaries and conforms Voronoi cell edges accurately to the internal boundary geometry.

Two unstructured grids were formed using the same unconstrained Voronoi gridding method. However, in the first gridding diagram 60 as shown in FIG. 6A, gridding results are obtained when the methodology of the present invention is not applied on internal boundaries. This can be seen from the near internal boundary area in FIG. 6A that the grids near the internal boundaries are not affected by the existing of internal boundary geometry, thus the Voronoi cell edges near the internal boundary do not conform to the internal boundary geometry.

In FIG. 6B, gridding results are obtained when the methodology of the present invention is used. The gridding diagram 62 of FIG. 6B shows all the internal boundaries in the field. The gridding diagram 60 of FIG. 6B clearly shows, in contrast to FIG. 6A, that the unconstrained Voronoi grid generation method is applied on all internal boundaries, including intersected internal boundaries, and the optimally generated unstructured grid cells honor all the internal boundary geometries. The irregular geometry structures of the internal boundaries are correctly preserved. This can be clearly seen from the near internal boundary grids in diagram 62 of FIG. 6B that the Voronoi cell edges conform to the internal boundary geometry.

FIGS. 7A and 7B are enlarged views of portions of the reservoir gridding according to FIGS. 6A and 6B, respectively, for a first of the two reservoirs under study. In the enlarged views in FIGS. 7A and 7B, the Voronoi grids in FIG. 7B are clearly demonstrated near the internal boundaries where the Voronoi cell edges honors and conforms to the internal boundary geometries so that the internal boundaries are preserved by using the patent method. On the other hand, in FIG. 7A, such Voronoi grids do not exist near the internal boundaries as the patent method is not applied. Similarly, FIGS. 8A and 8B are enlarged views of portions of the reservoir gridding according to FIGS. 6A and 6B, respectively, for a second of the two reservoirs under study. In the near internal boundary areas in FIGS. 8A and 8B, the Voronoi cells in FIG. 8B are clearly shown near the internal boundaries as the patent method is applied in FIG. 8B but such Voronoi cells do not exist in FIG. 8A as the patent method is not used.

Figure 9A:
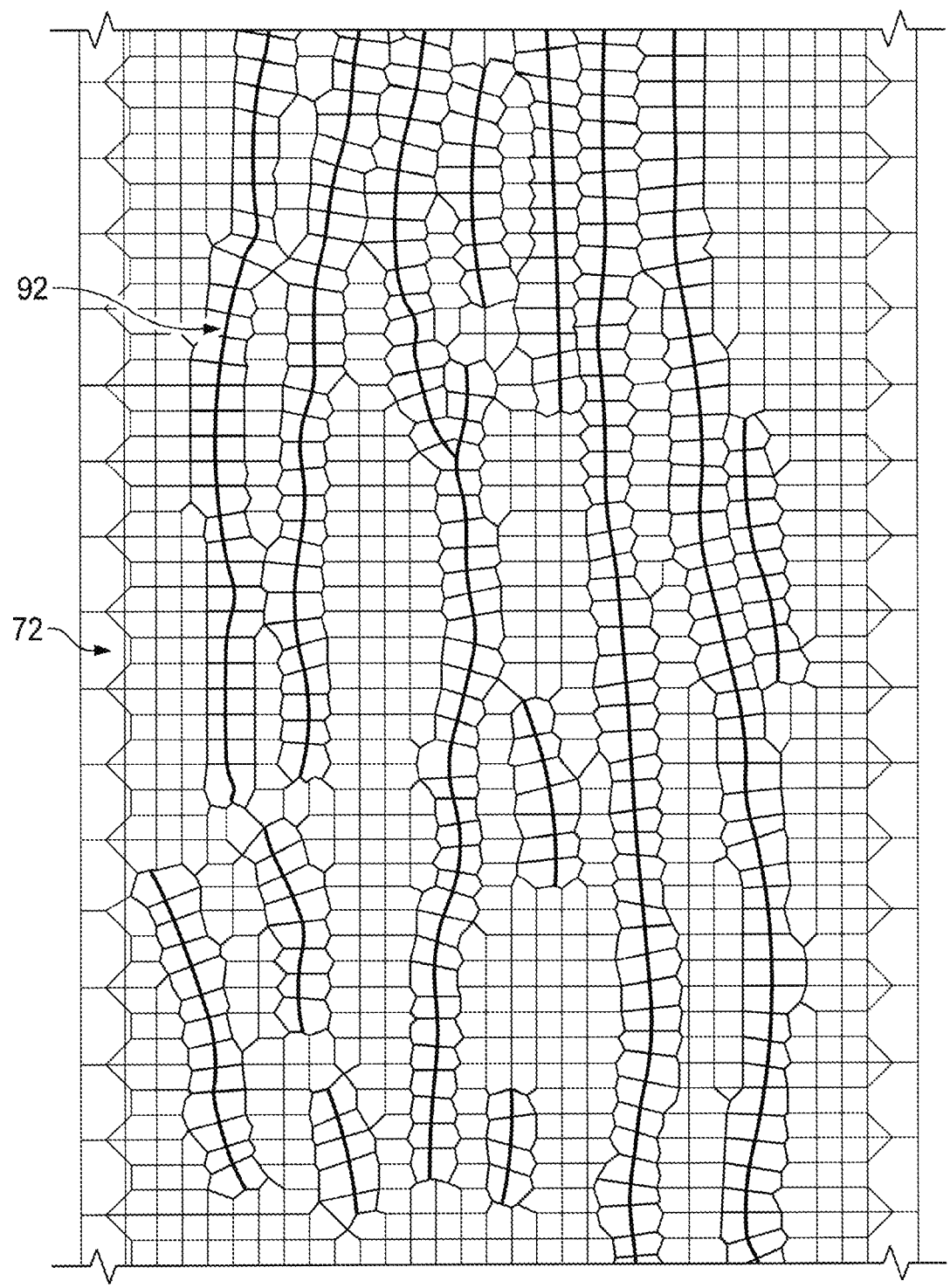
FIG. 9A is an enlarged view of a local region of a portion of FIG. 7B.
Figure 9B:
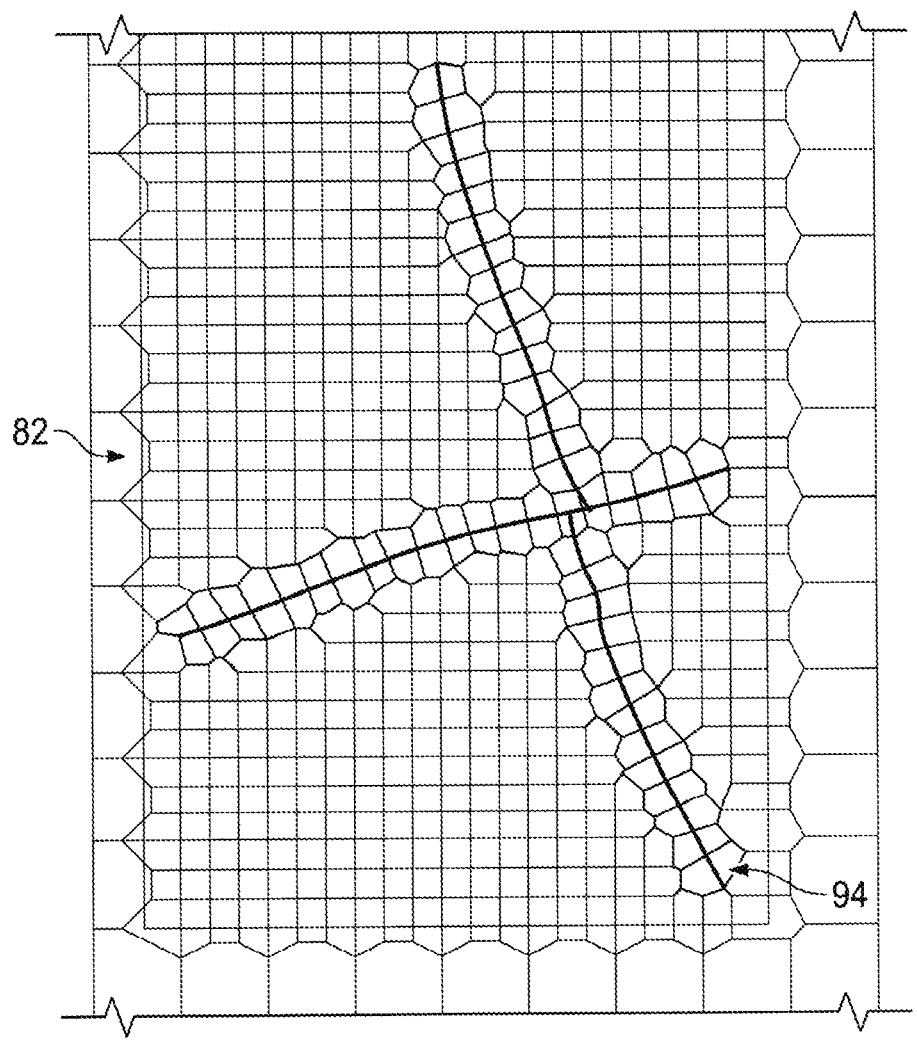
FIG. 9B is an enlarged view of a local region of a portion of FIG. 8B.

In FIG. 9A an enlarged view of a local region 72 of FIG. 7B is displayed, indicating at region 92 how the Voronoi cells of local region 72 in the 2 reservoirs are presented to illustrate the benefit of using the present invention. Similarly, in FIG. 9B, an enlarged view of a local region 82 of FIG. 8B is displayed, again as shown at region 94 to illustrate the benefit of using the present invention. FIGS. 9A and 9B also demonstrate that when there are internal boundary intersections, the optimally placed internal boundary grid points balance the requirement of near internal boundary region grid density and also the internal boundary geometry.

Figure 10B:
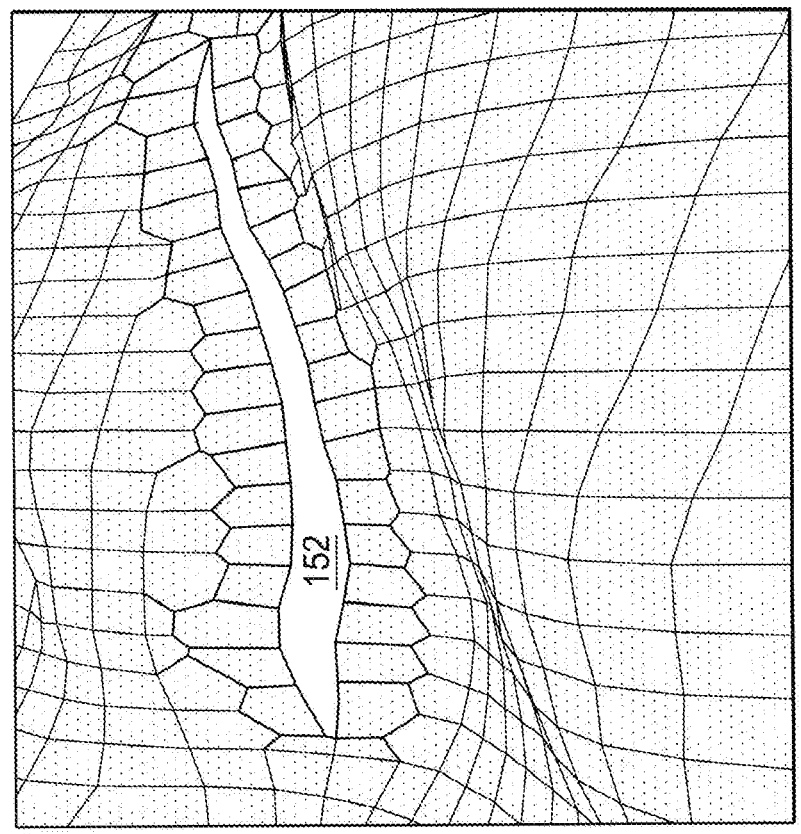
FIG. 10B is a display of Voronoi cells in 3D of cell vertices on one layer across an internal boundary formed according to the present invention.
Figure 10A:
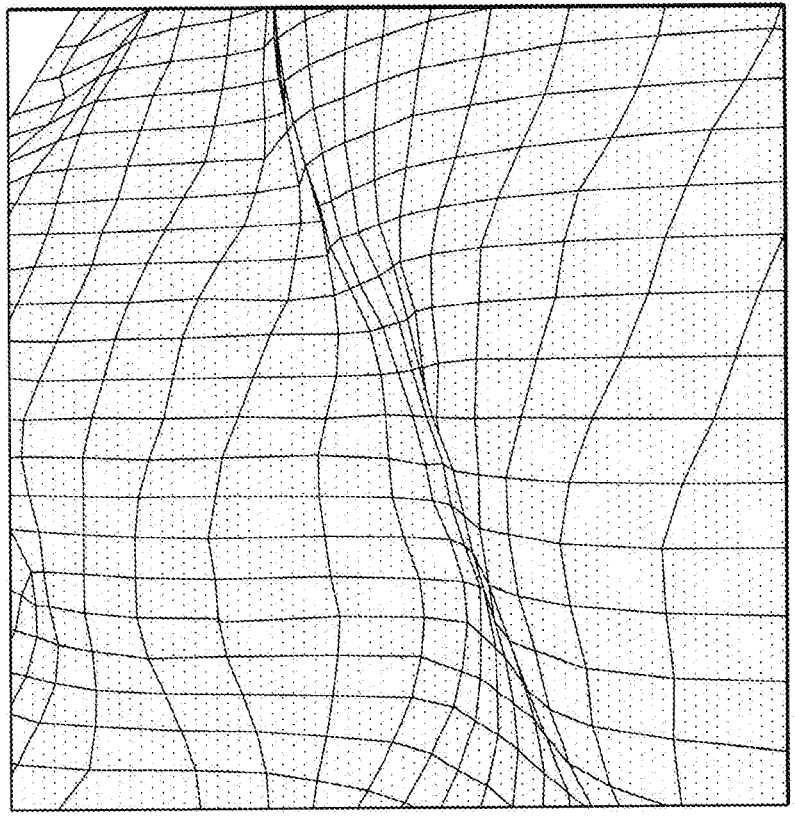
FIG. 10A is a display of Voronoi cells in 3D of cell vertices on one layer across an internal boundary formed without practice of the present invention.

FIGS. 10A and 10B are displays presented for the comparison of Voronoi cells in 3D to show the cell vertices across an internal boundary, in this case a fault in a reservoir to be subject to reservoir simulation. An internal boundary 74 in FIG. 7B can be seen to have a different depth at, shown as a gap at region 152 in FIG. 10B after processing according to the present invention, while the internal boundary is not correctly modeled in FIG. 10A when the methodology of the present invention is not used. The difference of the cell vertices depth across the internal boundary, as shown in the gap in region 152 in FIG. 10B demonstrates the value of the present invention on the internal boundary gridding. The present invention thus accurately models the discontinuity and displacement in the volume of rock near an internal boundary as a result of a discontinuity, which in this example is a fault.

Figure 11B:
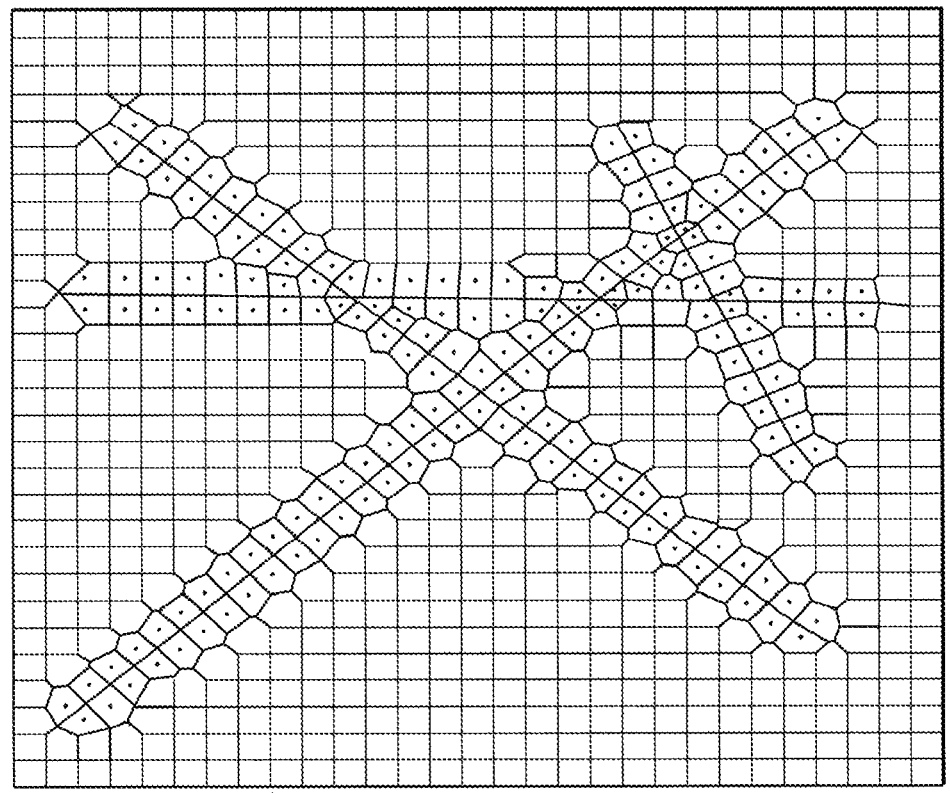
FIG. 11B is a display of Voronoi cells of intersected internal boundaries according to the present invention.
Figure 11A:
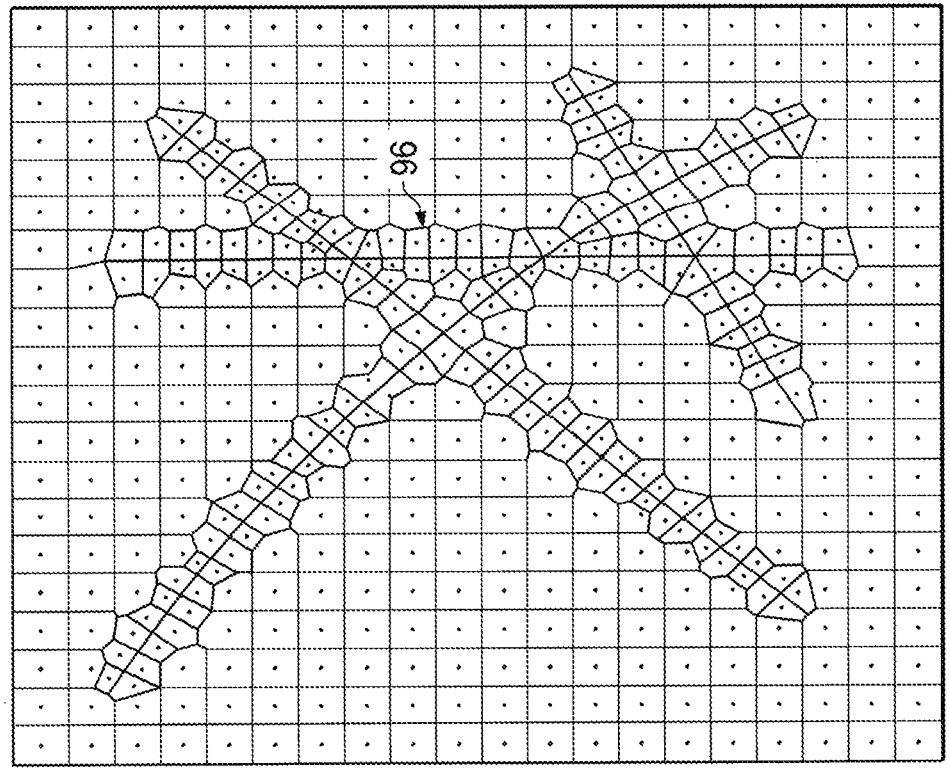
FIG. 11A is a display of Voronoi cells of intersected internal boundaries according to the prior art.

FIGS. 11A and 11B are displays of Voronoi cells of intersected internal boundaries presented for comparison purposes. FIG. 11A is a display of Voronoi cells of intersected internal boundaries formed according to the techniques of SPE Paper 48998 by Heinemann et al. previously mentioned. As shown in FIG. 11A, the Voronoi grid generation described in SPE Paper 48998 produces less acceptable Voronoi grids for computational purposes in an internal-boundary intersection area 96 when multiple internal boundaries intersect. With the SPE Paper technique, all of the internal-boundary grid points are kept without any optimization. As a result, the grid density requirement in the near-internal-boundary area is not maintained and congestion of grid points is seen in the near-internal-boundary region 96. Such crowded grid points lead to badly shaped triangles with small angles which eventually generate many small Voronoi cells.

FIG. 11B is a display of Voronoi cells of intersected internal boundaries formed according to the present invention. As seen in FIG. 11B, the present invention with its removal strategy for conflicting internal-boundary grid-points manages the conflicting points optimally based on the grid density and grid point location. As a result, optimal spacing between grid points is maintained and triangles with desired angles and shapes are generated which lead to better distributed Voronoi cells.

Data Processing System

Figure 12:
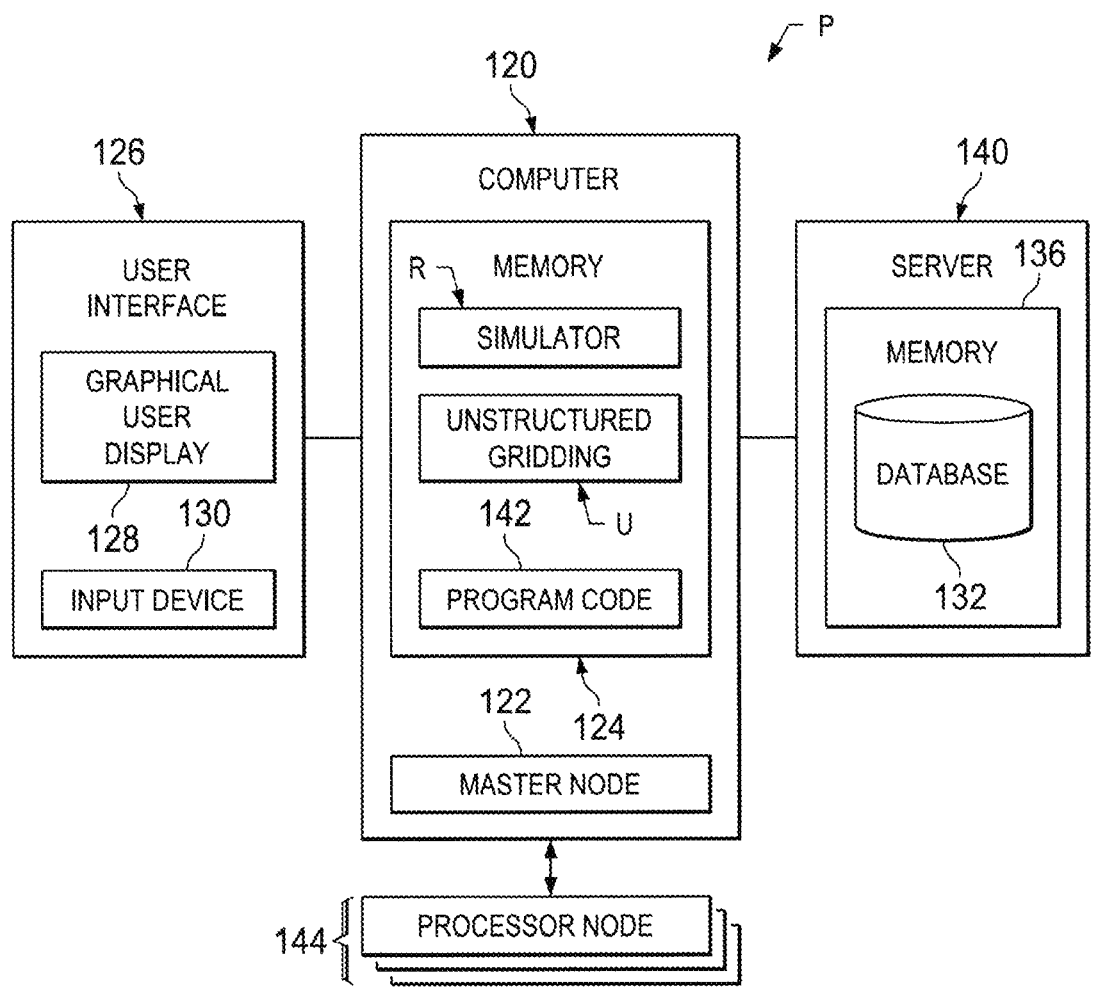
FIG. 12 is a schematic diagram of a computer network for generating unconstrained Voronoi grids in a domain containing complex internal boundaries according to the present invention.

As illustrated in FIG. 12, the data processing system P includes a computer 120 having a master node processor 122 and memory 124 coupled to the processor 122 to store operating instructions, control information and database records therein. The data processing system P is preferably a multicore processor with nodes such as those from Intel Corporation or Advanced Micro Devices (AMD), or an HPC Linux cluster computer. The data processing system P may also be a mainframe computer of any conventional type of suitable processing capacity such as those available from International Business Machines (IBM) of Armonk, N.Y. or other source. The data processing system P may in cases also be a computer of any conventional type of suitable processing capacity, such as a personal computer, laptop computer, or any other suitable processing apparatus. It should thus be understood that a number of commercially available data processing systems and types of computers may be used for this purpose.

The processor 122 is accessible to operators or users through user interface 126 and is available for displaying output data or records of processing results obtained according to the present invention with an output graphic user display 126. The output display 126 includes components such as a printer and an output display screen capable of providing printed output information or visible displays in the form of graphs, data sheets, graphical images, data plots and the like as output records or images.

The user interface 126 of computer 120 also includes a suitable user input device or input/output control unit 130 to provide a user access to control or access information and database records and operate the computer 120. Data processing system P further includes a database 132 of data including grid coordinate data and internal boundary description data stored in computer memory, which may be internal memory 124, or an external, networked, or non-networked memory as indicated at 136 in an associated database server 140.

The data processing system P includes program code 142 stored in non-transitory memory 124 of the computer 120. The program code 142 according to the present invention is in the form of computer operable instructions causing the data processor 122 to generate unconstrained Voronoi grids in a domain or reservoir containing complex internal boundaries according to the present invention in the manner that has been set forth.

The computer memory 124 also contains stored computer operating instructions in the non-transitory form of a Reservoir Simulator Module R, unstructured gridding module U according to Applicant's prior co-pending U.S. application, and also the data from data base 132 being manipulated and processed by the processor 122.

It should be noted that program code 142 may be in the form of microcode, programs, routines, or symbolic computer operable languages that provide a specific set of ordered operations that control the functioning of the data processing system P and direct its operation. The instructions of program code 142 may be stored in memory 124 of the data processing system P, or on computer diskette, magnetic tape, conventional hard disk drive, electronic read-only memory, optical storage device, or other appropriate data storage device having a computer usable non-transitory medium stored thereon. Program code 142 may also be contained on a data storage device such as server 140 as a non-transitory computer readable medium, as shown.

The program code 142 is a component which provides fault gridding to the unstructured gridding methodology U for complex wellbores of Applicant's prior co-pending U.S. application serves as grid generator for the reservoir simulator R, preferably Applicant's massively parallel reservoir simulator GigaPOWERS. The simulator R is thus with the present invention capable of doing large-scale unstructured-grid simulation for models with complex internal boundaries, such as faults and complex wells.

The data processing system P may be comprised of a single CPU, or a computer cluster as shown in FIG. 12, including computer memory and other hardware that makes it possible to manipulate data and obtain output data from input data. A cluster is a collection of computers, referred to as nodes, connected via a network. Usually a cluster has one or two head nodes or master nodes 122 that are used to synchronize the activities of the other nodes, referred to as processing nodes 144. The processing nodes 144 all execute the same computer program and work independently on different segments of the grid which represents the reservoir.

Accordingly, in modeling for reservoir simulation according to the present invention, the internal boundary description data is initially prepared or made ready for processing. For reservoir simulation, this can be the output from the reservoir simulation pre-processing software which builds the geological models.

The internal boundary description data is loaded into the data processing system P for generating the unstructured-grid building. The internal boundary description data is interpreted and converted to geometry points with 3D coordinates, which for a reservoir can be based on the structure of the geological model.

The geometry points corresponding to the initial internal boundary description are refined by balancing the requirement of near internal boundary grid density and accurate modeling of the internal boundary geometry. Interpolation can be applied to insert a new point to the initial point set when the new point is geometrically necessary to satisfy the two requirements, but it does not exist in the existing point set.

Points in the refined point set are connected to build line segments to approximate the internal boundary represented in the initial description. Circles for each end point of the line segments are constructed by using the end point as the center and the line segment length based radius. The circle-intersection points are optimally prioritized to remove conflict points. The intersected points from the optimal point set are then brought into the unconstrained Delaunay triangulation procedure by using them as triangle vertices. The dual grid of the Delaunay triangulation is then generated to obtain Voronoi cells via perpendicular bisection.

The present invention thus generates Voronoi cells without constraints for any number of internal boundaries in a domain. This technique can be easily applied for accurate flow simulations near internal boundaries such as faults. The fault surfaces can be sealing, partially sealing or conductive.

The present invention also generates near-internal-boundary grid points on either side of the fault lines (or other media discontinuities) which guarantees that the fault traces form the triangle's edges in an unconstrained Delaunay triangulation. Multiple boundary traces can intersect each other. The present invention optimizes on point spacing and internal boundary geometry representation simultaneously so that congested grids and grid slithers, thin triangles, do not occur.

In Applicant's prior co-pending application Ser. No. 14/171,815, an accurate near-wellbore modeling technology by using unstructured gridding is provided. For the wellbores, the Voronoi cell centers are used to follow the wellbore trajectories. With the present invention, processing capabilities are provided that include modeling of internal boundaries via Voronoi cell edges. These internal boundaries can be faults or hydraulic unit boundaries. This modeling capability is incorporated into structured-gridding processing to generate accurate internal boundary conforming grids which are unstructured. The resulting unstructured grids can easily be used in parallel reservoir simulation.

Prior art reservoir simulation practice typically used corner-point-geometry grid to represent faults. CPG gridding caused either excessive numerical errors or slow convergence in reservoir simulation. Many reservoirs contain some discontinuities; it is good practice to include faults accurately as internal boundaries during flow simulation. The simulation then produces better results and enhances the value of reservoir simulation practice. The present invention provides added internal boundary modeling capabilities. In addition to near-well gridding situations, a reservoir with both complex wellbores and irregular internal boundaries such as faults can be accurately modeled in a reservoir simulator.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined methodology, or in the performance and utilization thereof, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A computer implemented method of reservoir simulation of flow near internal boundaries in a model of a subsurface reservoir, the model having an unstructured grid comprising grid points and the internal boundaries, the internal boundaries including at least one irregular internal boundary, the model being generated based on input data defining internal boundary geometry descriptions of the reservoir model, the unstructured grid of the model further satisfying grid density and internal boundary modeling requirements to conform to the internal boundaries and the at least one irregular internal boundary, the method being performed in a data processing system comprising a reservoir simulator module, a processor and a memory, and comprising the computer implemented steps of:
   storing in the memory computer operable instructions for performing the reservoir simulation of the model of the subsurface reservoir;
   forming the model by performing, in the processor under control of the stored computer operable instructions, the computer implemented steps of:
   (a) refining the internal boundary geometry data to produce a partial set of geometry data points representative of the at least one irregular internal boundary of the model, the refining further taking into account near internal boundary grid spacing requirements of the model;
   (b) building lines by connecting adjacent ones of the partial set of geometry data points representative of the at least one irregular internal boundary of the model from the step above to form internal boundary line segments;
   (c) constructing internal boundary intersected circles at each of the adjacent ones of the partial set of geometry data points representative of the at least one irregular internal boundary of the model;
   (d) generating additional grid points between intersections of internal boundary intersected circles of the adjacent ones of the partial set of geometry data points representative of the at least one irregular internal boundary of the model;
   (e) prioritizing conflicts between the generated additional grid points and the geometry data points by assigning weighted values with higher priority to the generated additional grid points which satisfy the near internal boundary grid density requirement of the model, and removing the generated additional grid points which violate the near internal boundary grid density requirement;
   (f) performing unconstrained Delaunay triangulation on the prioritized generated additional internal boundary grid points to form internal boundary grid line segments including lines representative of the at least one irregular internal boundary of the model;
   (g) generating Voronoi cells to form the model with unstructured gridding data with Voronoi cell edges corresponding to the formed internal boundary grid line segments including the lines representative of the at least one irregular internal boundary of the model;
   (h) performing an output of the formed model of the reservoir with unstructured gridding data with Voronoi cell edges corresponding to the formed internal boundary grid line segments including the lines representative of the at least one irregular internal boundary; and
   performing in the reservoir simulator module the reservoir simulation of the flow near the internal boundaries in the formed model of the reservoir with the unstructured grid with the Voronoi cell edges corresponding to the formed internal boundary grid line segments including the lines representative of the at least one irregular internal boundary and conforming to the at least one irregular internal boundary of the reservoir.

2. The computer implemented method of claim 1, wherein the data processing system further includes an output display and further including the step of:
   forming with the output display an output display of the formed model of the reservoir with the unstructured grid.

3. The computer implemented method of claim 1, further including the step of:
   storing in the memory of the formed model of the reservoir with the unstructured grid.

4. The computer implemented method of claim 1, wherein the internal boundary comprises a fault in the reservoir.

5. The computer implemented method of claim 1, wherein the irregular internal boundary comprises a discontinuity in the reservoir.

6. The computer implemented method of claim 5, wherein the discontinuity in the reservoir is selected from a group consisting of fractures, boundaries for faces, and hydraulic units.

7. The computer implemented method of claim 1, wherein the step of refining the internal boundary geometry data comprises selecting a partial set of geometry data points where the distance between adjacent geometry data points satisfies internal boundary grid spacing requirements.

8. The computer implemented method of claim 7, wherein the step of refining the internal boundary geometry data further includes the step of adding interpolated grid points when the existing geometry data points of the initial points set cannot satisfy both the grid boundary spacing requirement and internal boundary geometry representation.

9. A data processing system for reservoir simulation of a model of flow near internal boundaries in a subsurface reservoir, the model having an unstructured grid comprising grid points and internal boundaries, the internal boundaries including at least one irregular internal boundary, the model being generated based on input data defining internal boundary geometry descriptions of the reservoir model, the unstructured grid of the model further satisfying grid density and internal boundary modeling requirements to conform to the internal boundaries including the at least one irregular internal boundary, the data processing system comprising:
   a memory storing computer operable instructions for performing the reservoir simulation of the model of a subsurface reservoir; and
   a processor operating under control of the stored program instructions and forming the model by performing the steps of:
   (a) refining the internal boundary geometry data to produce a partial set of geometry data points representative of the at least one internal boundary of the model, the refining further taking into account near internal boundary grid spacing requirements;
   (b) building lines connecting adjacent ones of the partial set of grid cell points representative of the at least one irregular internal boundary of the model to form boundary line segments;

(c) constructing internal boundary intersected circles at each of the adjacent ones of the partial set of geometry data points representative of the at least one irregular internal boundary of the model;

(d) generating additional grid points between intersections of internal boundary intersected circles of the adjacent ones of the partial set of geometry data points representative of the at least one irregular internal boundary of the model;

(e) prioritizing conflicts between the generated additional grid points and the geometry data points by assigning weighted values with higher priority to the generated additional internal boundary grid points which satisfy the near internal boundary grid density requirement of the model, and removing the generated additional internal boundary grid points which violate the near internal boundary grid density requirement;

(f) performing unconstrained Delaunay triangulation on the prioritized generated additional internal boundary grid points to form internal boundary grid points line segments including lines representative of the at least one irregular internal boundary of the model;

(g) generating Voronoi cells to form the model unstructured gridding data with Voronoi cell edges corresponding to the formed internal boundary line segments including lines representative of the at least one irregular internal boundary of the model;

(h) providing an output of the formed model of the reservoir with unstructured gridding data with Voronoi cell edges corresponding to the formed internal boundary grid line segments including the lines representative of the at least one irregular internal boundary; and a reservoir simulator module performing reservoir simulation of flow near the internal boundaries in the formed model of the reservoir with the unstructured grid with the Voronoi cell edges corresponding to the formed internal boundary grid line segments including the lines representative of the at least one irregular internal boundary of the reservoir.

10. The data processing system of claim 9, wherein the data processing system further includes an output display forming an output display of the provided output of the formed model of the reservoir with the unstructured grid.

11. The data processing system of claim 9, wherein the memory further stores the provided output of the formed model of the reservoir with the unstructured grid.

12. The data processing system of claim 9, wherein the irregular internal boundary comprises a fault in the reservoir.

13. The data processing system of claim 9, wherein the irregular internal boundary comprises a discontinuity in the reservoir.

14. The data processing system of claim 13, wherein the discontinuity in the reservoir is selected from a group consisting of fractures, boundaries for faces, and hydraulic units.

15. The data processing system of claim 9, wherein the processor in the step of refining the internal boundary geometry data selects a partial set of geometry data points where the distance between adjacent geometry data points satisfies internal boundary grid spacing requirements.

16. The data processing system of claim 15, wherein the processor in the step of refining the internal boundary geometry data further adds interpolated geometry data points when the existing geometry data points of the points in the partial set cannot satisfy both the grid boundary spacing requirement and internal boundary geometry representation.

* * * * *

UNITED STATES PATENT AND TRADEMARK OFFICE
CERTIFICATE OF CORRECTION

PATENT NO. : 10,677,960 B2
APPLICATION NO. : 14/215851
DATED : June 9, 2020
INVENTOR(S) : Xiang Yang Ding, Larry Siu-Kuen Fung and Ali H. Dogru Page 1 of 1

It is certified that error appears in the above-identified patent and that said Letters Patent is hereby corrected as shown below:

In the Claims

In Claim 4, Column 14, Line 23 reads:
"the internal boundary compreises a fault in the reservoir."
It should read:
"the irregular internal boundary comprises a fault in the reservoir."

Signed and Sealed this
Twenty-eighth Day of July, 2020

Andrei Iancu
*Director of the United States Patent and Trademark Office*